United States Patent
Ha et al.

(10) Patent No.: US 7,053,538 B1
(45) Date of Patent: May 30, 2006

(54) SECTIONED RESISTOR LAYER FOR A CARBON NANOTUBE ELECTRON-EMITTING DEVICE

(75) Inventors: Chang Chul Ha, San Jose, CA (US); Kang Sung Gu, San Jose, CA (US)

(73) Assignee: cDream Corporation, San Jose, CA (US)

( * ) Notice: Subject to any disclaimer, the term of this patent is extended or adjusted under 35 U.S.C. 154(b) by 0 days.

(21) Appl. No.: 10/080,012

(22) Filed: Feb. 20, 2002

(51) Int. Cl.
*H01J 1/62* (2006.01)

(52) U.S. Cl. .................................. 313/309; 313/495

(58) Field of Classification Search ............ 313/309, 313/336, 351, 495, 310, 496, 497, 306; 445/24, 445/25, 50, 51
See application file for complete search history.

(56) References Cited

U.S. PATENT DOCUMENTS

| | | | |
|---|---|---|---|
| 5,496,200 A | | 3/1996 | Yang et al. |
| 5,789,856 A | | 8/1998 | Itoh et al. |
| 5,828,163 A | * | 10/1998 | Jones et al. .................. 313/336 |
| 5,831,378 A | * | 11/1998 | Rolfson et al. ............. 313/336 |
| 5,847,407 A | | 12/1998 | Lucero et al. |
| 5,872,422 A | | 2/1999 | Xu et al. |
| 5,973,444 A | | 10/1999 | Xu et al. |
| 6,062,931 A | | 5/2000 | Chuang et al. |
| 6,133,678 A | * | 10/2000 | Kishino et al. ............. 313/309 |
| 6,144,144 A | | 11/2000 | Cleeves et al. |
| 6,204,597 B1 | * | 3/2001 | Xie et al. ..................... 313/310 |
| 6,515,415 B1 | | 2/2003 | Han et al. |
| 2002/0079802 A1 | | 6/2002 | Inoue et al. |

OTHER PUBLICATIONS

International Search Report, PCT/US03/26313, Jan. 14 2005.

* cited by examiner

*Primary Examiner*—Joseph Williams
(74) *Attorney, Agent, or Firm*—Fenwick & West LLP (57) ABSTRACT

An electron-emitting device contains an emitter resistor layer patterned into multiple laterally separated sections situated between the electron-emissive elements, on one hand, and emitter electrodes, on the other hand. Sections of the seed layer are spaced apart along each emitter electrode to electrically decouple electron emission elements disposed on the resistor layer.

20 Claims, 13 Drawing Sheets

SECTIONED RESISTOR LAYER FOR A CARBON NANOTUBE ELECTRON-EMITTING DEVICE

CROSS REFERENCE TO RELATED APPLICATION

This is related to U.S. application Ser. No. 10/080,057, filed Feb. 20, 2002, which is herein incorporated in its entirety by reference.

FIELD OF USE

This invention relates to carbon based field emitters. More particularly, this invention relates to the structure and fabrication of an electron-emitting device in which electrically conductive seed material is situated between electron-emissive elements, on one hand, and emitter electrodes, on the other hand, and which is suitable for use in a flat-panel display of the cathode-ray tube ("CRT") type.

BACKGROUND

A flat-panel CRT display basically consists of an electron-emitting device and a light-emitting device that operate at low internal pressure. The electron-emitting device, commonly referred to as a cathode, contains electron-emissive elements that emit electrons over a wide area.

The emitted electrons are directed towards light-emissive elements distributed over a corresponding area in the light-emitting device. Upon being struck by the electrons, the light-emissive elements emit light that produces an image on the viewing surface of the display.

Figure 1A:
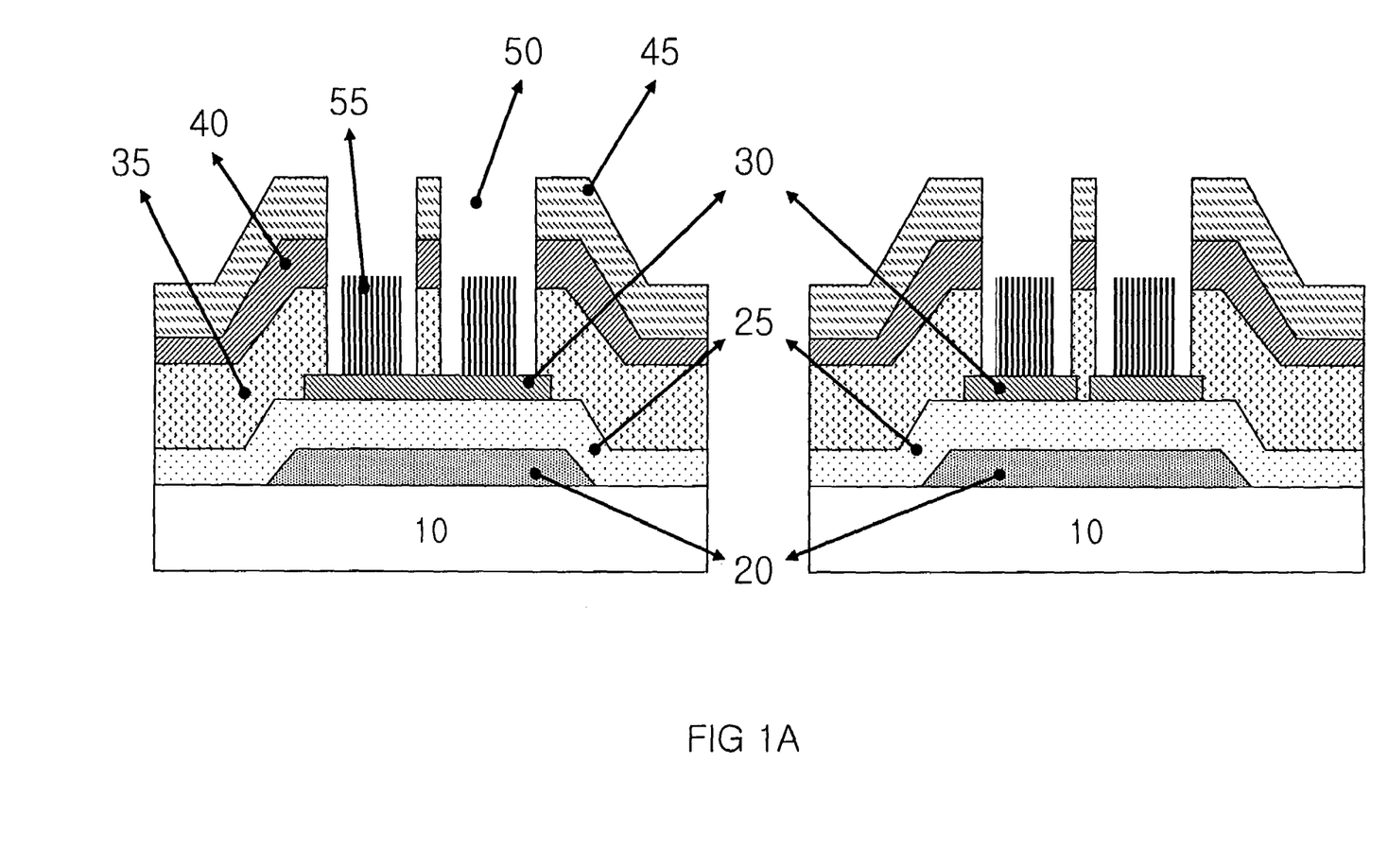
FIG. 1A is a cross-sectional view of the core of a conventional electron-emitting device.
Figure 1B:
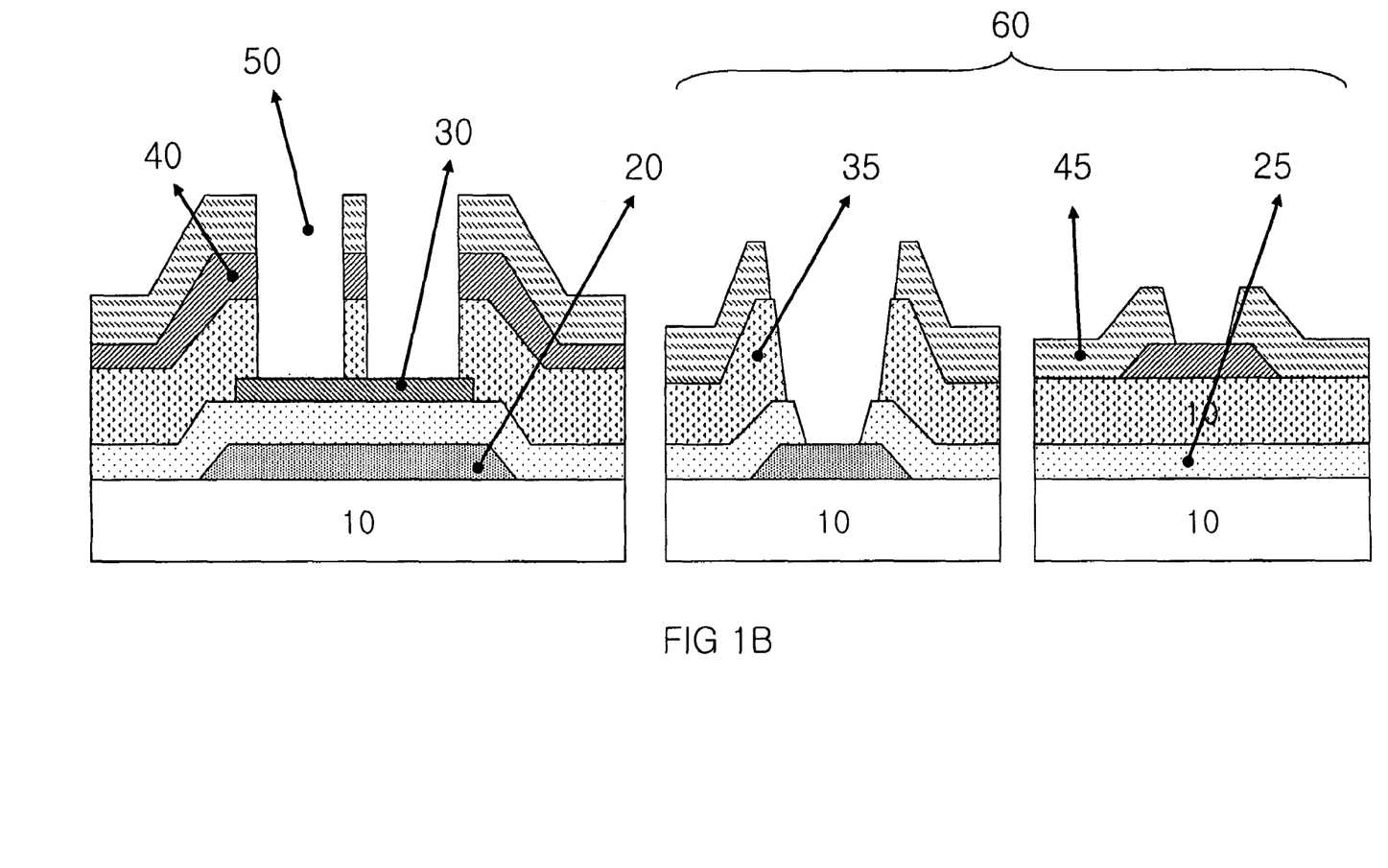
FIG. 1B is a cross-sectional view of a conventional electron-emitting device showing a pad region.

When the electron-emitting device operates according to field-emission principles, electrically conductive seed material is commonly placed in series with the electron-emissive elements to gate the magnitude of current flow through the electron-emissive elements. FIG. 1 illustrates a conventional field-emission device, that so utilizes the seed material.

In the field emitter of FIG. 1, electrically seed (catalyst) layer 30 overlies emitter electrodes 20 provided on baseplate 10. Gate (or gate) electrodes 40, one of which is depicted in FIG. 1, are situated on dielectric layer 35 and passivation layer 45 situated on the gate layer 40 and cross over emitter electrodes 20. Electron-emissive elements 55 are situated on emitter conductive layer 30 in openings 50 through dielectric layer 35 and are exposed through corresponding openings 50 in gate electrodes 40.

Seed layer 30 is typically a blanket layer. That is, seed layer 30 extends in a continuous manner over the emitter electrodes 20 and the intervening portions of baseplate 10. Consequently, each electron-emissive elements 55 is electrically coupled through seed layer 30 to each other element 55. In the prior art device shown in FIG. 1, the electron emissive elements are a group carbon based filaments.

The catalyst layer 30 is normally a conductive material that is layer 30 effectively does not electrically isolate each group of elements 55 from each other. Thus, there could be a kind of intercoupling of electrons emissive elements 55 through layer 30. That means electron emission from a group of elements 55 would have an effect on the other group of element 55. A degradation or an emitting of one group of elements 55 usually means other groups of elements 55 would have an effect on the emitting of other groups of element 55.

The non-uniformity of deposition, patterning and etching of each process causes undesirable non-uniformity of the feature of electron emission elements 55. The non-uniformity of the electron emission elements creates a situation where the elements 55 have different threshold voltage for electron emission. Thus, most of elements 55 would not start to emit electrons at the same time.

Because of the intercoupling provided by catalyst layer 30, a few of the groups of the elements 55 that would have low value of voltage could become the primary source of electron emitting for the entire group in the display device rather than emitting electrons from most of the groups of elements 55. Thus, those elements 55 that act as a primary electron emitting source could result in the emitter degradation.

Furthermore, the field emitter device shown in FIG. 1 has a blanket resistor layer the overlies the emitter electrode 20. The blanket resistor layer 25 electrically couples each electron-emissive element 55 to each other. The resistance of layer 25 is sufficiently high that the inter-coupling of electron-emissive elements 55 has little effect on the display operation. In fact, layer 25 is normally of such high resistance that layer 25 effectively electrically isolates each element 55 from each other. However, there is still some undesirable leakage current flows between elements 55 due to the inter-coupling provided by layer 25.

Because layer 25 is a blanket layer that covers the emitter electrode 20 and extends in a continuous manner over intervening portions of the base plate including pad region 60 (FIG. 1B), portions of the resistor layer 25 in pad region 60 must be removed during masking step subsequent to the deposition of layer 25. This is costly, time consuming and results in an inefficient manufacturing fabrication of the display device.

It is therefore desirable to have a resistor layer that provides resistance at selected areas along base plate 10 but does not itself electrically interconnect these areas.

It is also desirable to have a pattern resistor layer along the base plate 10 upon which the carbon based emitter electrons are disposed and treated that reduces the number and/or complexities of steps conventionally required to fabricate the field emitter structure.

It is also desirable to configure the resistor layer in such a way that underlying emitter electrodes be externally electrically accessible along their upper surfaces without the necessity of performing a separate etching operation to cut openings through the seed layer. Furthermore, it is preferable to provide a suitable pattern in the resistor layer without employing any additional masking steps beyond those used for patterning other components in the field emitter.

GENERAL DISCLOSURE OF THE INVENTION

The present invention furnishes an electron-emitting device having a resistor layer patterned to meet the foregoing needs. The present resistor layer contains multiple laterally separated sections situated between electron-emissive elements, on one hand, and emitter electrodes, on the other hand. The sections of the resistor layer are spaced apart along each emitter electrode.

The resistor sections underlie seed sections of the present electron-emitting device in various ways. In one general embodiment, the seed sections are basically configured as resistor strips situated below the pattern seed layer upon which the carbon electron-emission elements are formed. Each resistor strip is sufficiently long to extend over at least one, typically all, of the emitter electrodes.

In another general embodiment of the resistor layer, the resistor sections are basically configured as resistor portions spaced apart below each seed layer and above each emitter electrode. As viewed in the vertical direction, the resistor portions are roughly centered at the locations where the gate electrodes cross over the emitter electrodes. As contrasted to the first-mentioned embodiment in which each resistor strip extends over one or more of the emitter electrodes, each resistor portion in this embodiment extends over only one of the emitter electrodes.

To manufacture an electron-emitting device that employs the patterned resistor layer of the invention, a structure is typically first provided in which a gate electrode overlies a dielectric layer that overlies an electrically resistor layer overlying an emitter electrode.

Electron-emissive elements are situated in a composite opening extending through the gate electrode and dielectric layer in the structure so that the electron-emissive element overlies the seed layer and the patterned resistor layer above the emitter electrode. Creation of the resistor sections involves removing portions of the resistor layer located generally below spaces situated to the sides of the gate electrode.

Again, there is no need to perform an extra masking step to provide this initial patterning to the resistor layer. The net result is that the desired pattern can be provided in the resistor layer without increasing the number of masking steps.

In some applications, a separate masking step may be employed in providing the requisite pattern in the resistor layer. Use of a separate masking step may arise as a matter of process convenience or due to overall processing constraints.

BRIEF DESCRIPTION OF THE DRAWINGS

Like reference symbols are employed in the drawings and in the description of the preferred embodiments to represent the same, or very similar, item or items.

DESCRIPTION OF THE PREFERRED EMBODIMENTS

In the present invention, a patterned resistor layer connected in series with electron-emissive elements of an electron-emitting device is patterned into multiple sections laterally separated along each emitter electrode in the device. The electron emitter of the invention typically operates according to field-emission principles in producing electrons that cause visible light to be emitted from corresponding light-emissive phosphor elements of a light-emitting device. The combination of the electron-emitting device, often referred to as a field emitter, and the light-emitting device forms a cathode-ray tube of a flat-panel display such as a flat-panel television or a flat-panel video monitor for a personal computer, a lap-top computer, or a workstation.

In the following description, the term "electrically insulating" (or "dielectric") generally applies to materials having a resistivity greater than $10^{10}$ ohm-cm. The term "electrically non-insulating" thus refers to materials having a resistivity below $10^{10}$ ohm-cm. Electrically non-insulating materials are divided into (a) electrically conductive materials for which the resistivity is less than 1 ohm-cm and (b) electrically resistive materials for which the resistivity is in the range of 1 ohm-cm to $10^{10}$ ohm-cm. These categories are determined at an electric field of no more than 1 volt/µm.

Examples of electrically conductive materials (or electrical conductors) are metals, metal-semiconductor compounds (such as metal silicides), and metal-semiconductor eutectics. Electrically conductive materials also include semiconductors doped (n-type or p-type) to a moderate or high level. The semiconductors may be of the monocrystalline, multicrystalline, polycrystalline, or amorphous type.

Electrically resistive materials include (a) metal-insulator composites such as cermet, (b) certain silicon-carbon compounds such as silicon carbide and silicon-carbon-nitrogen, (c) forms of carbon such as graphite, amorphous carbon, and modified (e.g., doped or laser-modified) diamond, and (d) semiconductor-ceramic composites. Further examples of electrically resistive materials are intrinsic and lightly doped (n-type or p-type) semiconductors.

A transverse profile is a vertical cross section through a plane perpendicular to the length of an elongated region. The row direction in a matrix-addressed field emitter for a flat-panel display is the direction in which the rows of picture elements (pixels) extend. The column direction is the direction in which the columns of pixels extend and runs perpendicular to the row direction.

Figure 2:
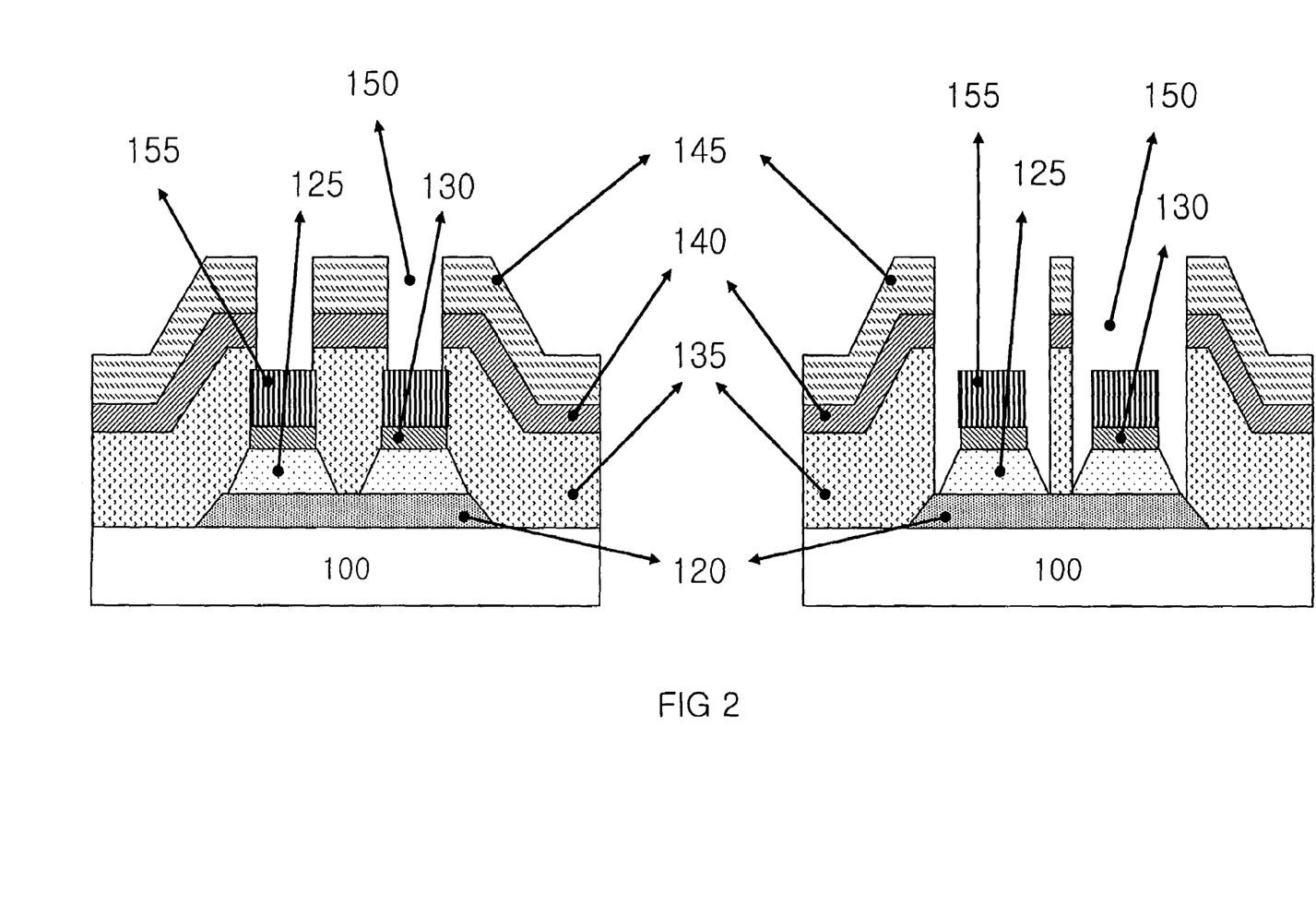
FIG. 2 is a cross-sectional structural view of the core of an electron-emitting device provided with a resistor layer patterned in accordance with the invention.

FIG. 2 illustrates the core of a matrix-addressed field emitters that contain an emitter conductor patterned into conductor strips in a vertically aligned manner according to the invention. The cross sections of FIG. 2 is taken through perpendicular planes.

The field emitter of FIG. 2 is created from a flat electrically insulating baseplate (substrate) 100 typically consisting of glass having a thickness of approximately 1 mm~2 mm. To simplify the pictorial illustration, baseplate 100 is shown in the perspective view of FIG. 2.

A patterned electrically conductive seed layer 130 is disposed on a resistor layer 125 which is in turn disposed on the emitter electrode 120. The seed layer 130 provides a seed platform on which the electron emission elements of the present invention are built.

The patterned seed layer 130 is disposed on a series of laterally separated patterned resistor layer strips 125. Each resistor strip 125 extends in the column direction and is spaced apart along each emitter electrode 120. Each resistor strip typically consists of a resistive metal. The thickness of the resistor strip 125 is 200–500 nm.

In one embodiment of the present invention, the patterned strips of seed layer 130 and the resistor strip 125 are typically aligned with the gate layer 140 and situated in openings 150 in a way to isolate groups of the electron emission elements 155 from each other. Isolating the group of electron emission elements ensures that a defect in one group does not affect the emission quality of the other groups.

In another embodiment of he present invention, the seed layer 130 and the resistor strip 125 are vertically aligned and not aligned with the gate layer 140.

To manufacture an electron-emitting device that employs the resistive layer of the present invention, a structure typically is first provided in which a gate electrode overlies a dielectric layer that overlies a seed layer for facilitation the deposition of the electron-emitting elements of the present invention. Creation of the resistor section involves removing portions of the resistor layer 125 locator in spaces below the dielectric layer 135 to the sides of the emitter electrode 120.

The removing step is performed by etching the resistor layer through a mask formed partially through the seed layer 130. By utilizing this removing step, there is no further need to perform an additional masking step to remove the resistor material from the pad region of the device after the other layers of the device have been deposited. Removing the resistor layer from the pad region enables the device to have an electrical contact region for connecting the driver electronics of the device. Fabrication of the present resistor layer is less costly and very efficient since it reduces the number of masking steps that is performed to fabricate the device.

Figure 3A:
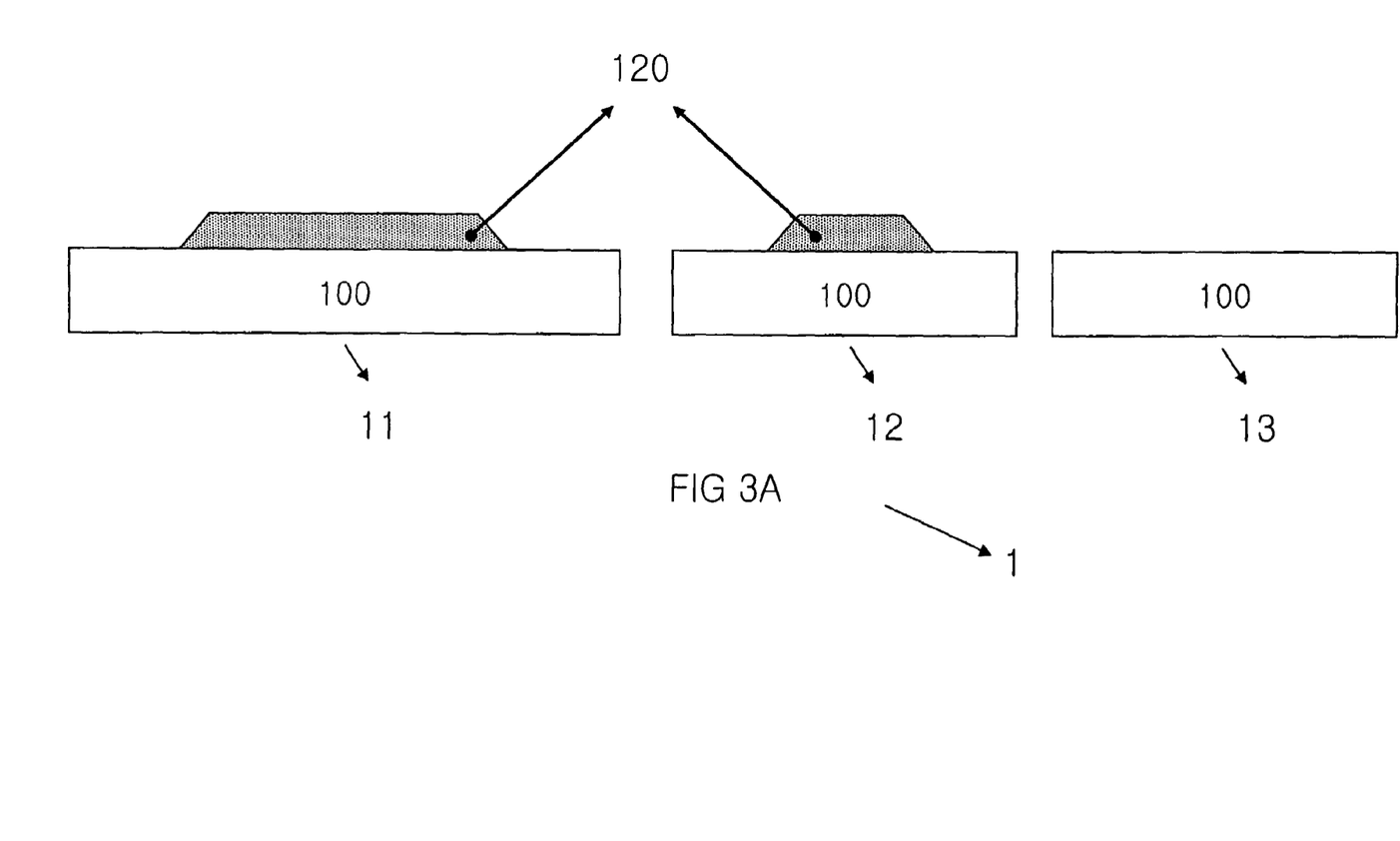
FIGS. 3a–3h are cross-sectional structural views representing steps in manufacturing an embodiment of the electron-emitting device of FIG. 2 according to the invention.

FIG. 3A depicts a partial cross-sectional representation of the field emitter structure 1 of one embodiment of the present invention showing a pixel section 11, a column pad section 12 and row pad section 13. The method fabricating the field emitter structure 1 generally includes providing a base plate 100 and disposing thereon a plurality of emitter electrodes. The group of generally parallel emitter electrodes 120 are situated on baseplate 100.

Emitter electrodes 120 extend in the row direction and constitute row electrodes. As shown in FIG. 3A, each emitter electrode 120 has a transverse profile roughly in the shape of an upright isosceles trapezoid. This profile helps improve step coverage of layers formed above emitter electrodes 120. The emitter electrode 120 does not extend in the row pad region 13.

Emitter electrodes 120 typically consist of aluminum, molybdenum, or chromium, or an alloy of any of these metals. In the case of aluminum, emitter electrodes 120 are typically 0.1–0.5 µm in thickness.

In one embodiment of the present invention, the emitter electrode 120 is deposited in-situ by a number of well known deposition methods of the prior art. In one embodiment. Sputter deposition may be used. In another embodiment, a form of evaporation deposition may be used.

Upon deposition of the emitter electrode 120, a photo-resistive material (PR) is coated on the emitter electrode 120. The photo-resistive coating is then soft baked. After coating and baking, the photo-resistive material is exposed according to a designed patterned and developed. After developing the photo-resist material, the photo-resist material is hard baked and the part of the emitter electrode which is opened through the PR after being developed is etched away and stripped away.

Figure 3B:
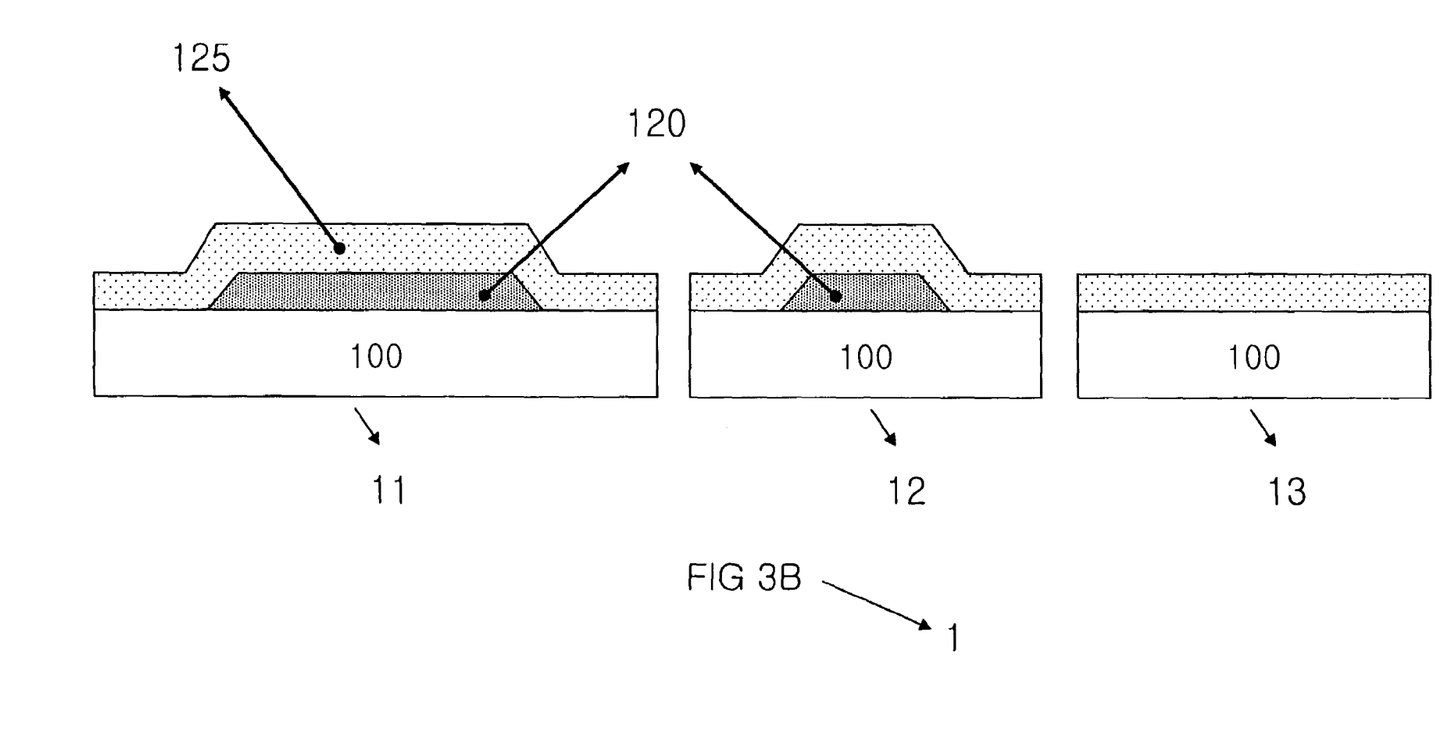

FIG. 3B depicts a partial cross-sectional representation of structure 1 having undergone further steps of deposition of a resistor layer 125. The resistor layer 125 is then fabricated by deposition of a layer of resistive material on the emitter electrode layer 120 and remaining surfaces of the glass 100 uncovered, including the row pad region 13 by the emitter electrode 120 material.

In one embodiment of the present invention, the resistor layer 125 is deposited by a number of well known methods in the art. In one embodiment, deposition of the resistor layer 125 is accomplished by plasma enhanced chemical vapor deposition (PECVD) method or sputtering method.

Figure 3C:
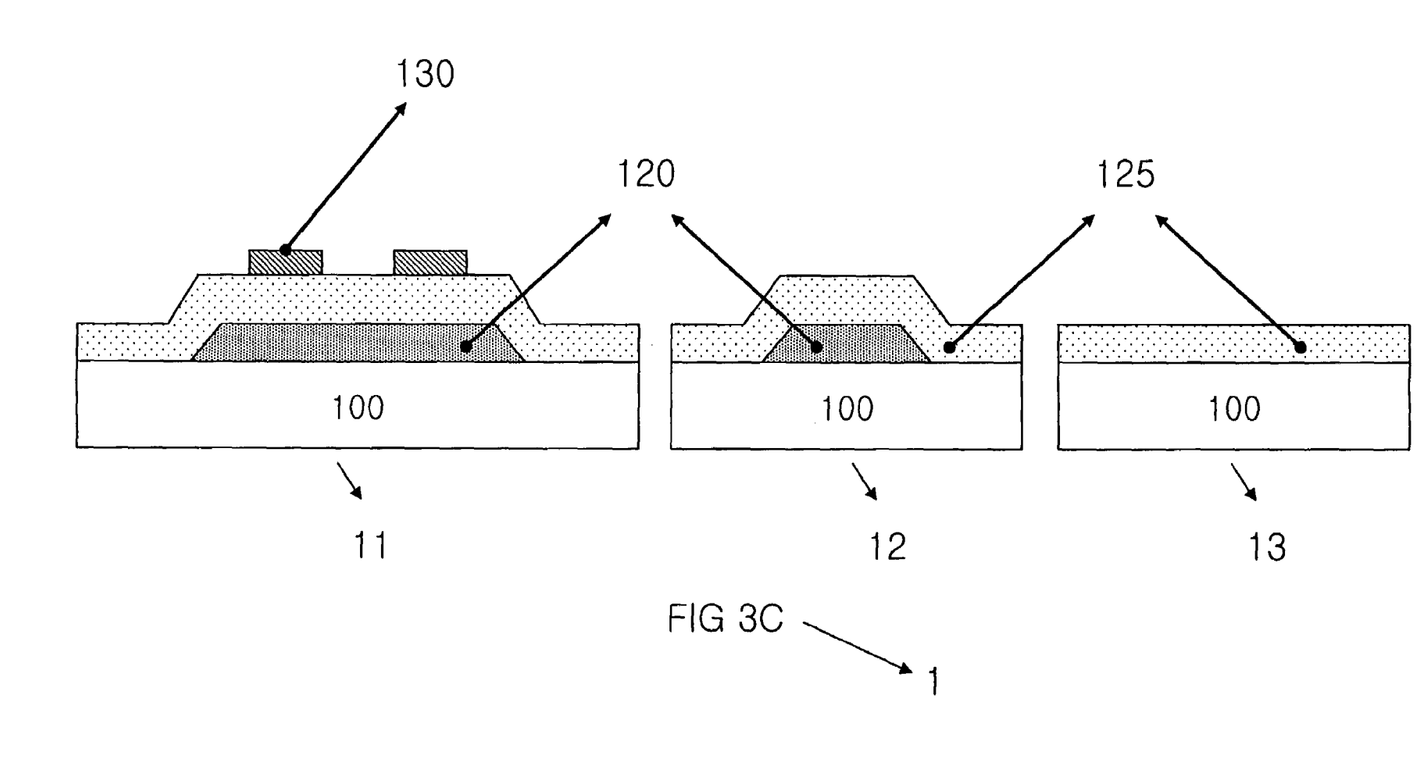

FIG. 3C depicts a partial cross-sectional representation of structure 1 having undergone further steps of depositing a conductive seed layer 130. A patterned electrically conductive seed layer consisting of a group of laterally separated generally parallel strips 130 is disposed on top of emitter electrodes 120 and resistor layer 125 in the pixel section region 11.

In one embodiment of the present invention, the seed layer 130 provides an enhanced seeding platform on which to deposit the electron emission elements of the invention. Conductive seed strips 130 extend in the column direction and are spaced apart along each emitter electrode 120. Each seed strip 130 extends over portions of electrodes 120.

Consequently, strips 130 overlie laterally separated parts of each electrode 120. Strips 130 would be a kind of vertical conductors in that current flows through strips 130 largely in the vertical direction between electrodes 120 and the overlying electron-emissive elements described below.

Each of seed strips 130 typically consists of nickel or an alloy of nickel. The thickness of the nickel layer is 0.01–0.15 am, typically 0.07 µm. In another embodiment the seed layer consist of cobalt or an alloy of cobalt. The thickness of the cobalt layer is 0.01–0.15 µm, typically 0.07 µm. In another embodiment of the present invention, the seed strip typically consist of iron or an alloy of iron.

Upon deposition of the seed layer 130, a photo-resistive material (PR) coats on the seed layer 130. After coating, the PR is soft baked and exposed. The PR is subsequently developed, hard baked and wet etched to conform to the contours of the surface of the glass 100. Remaining PR maskant is stripped by methods well known in the art.

Figure 3D:
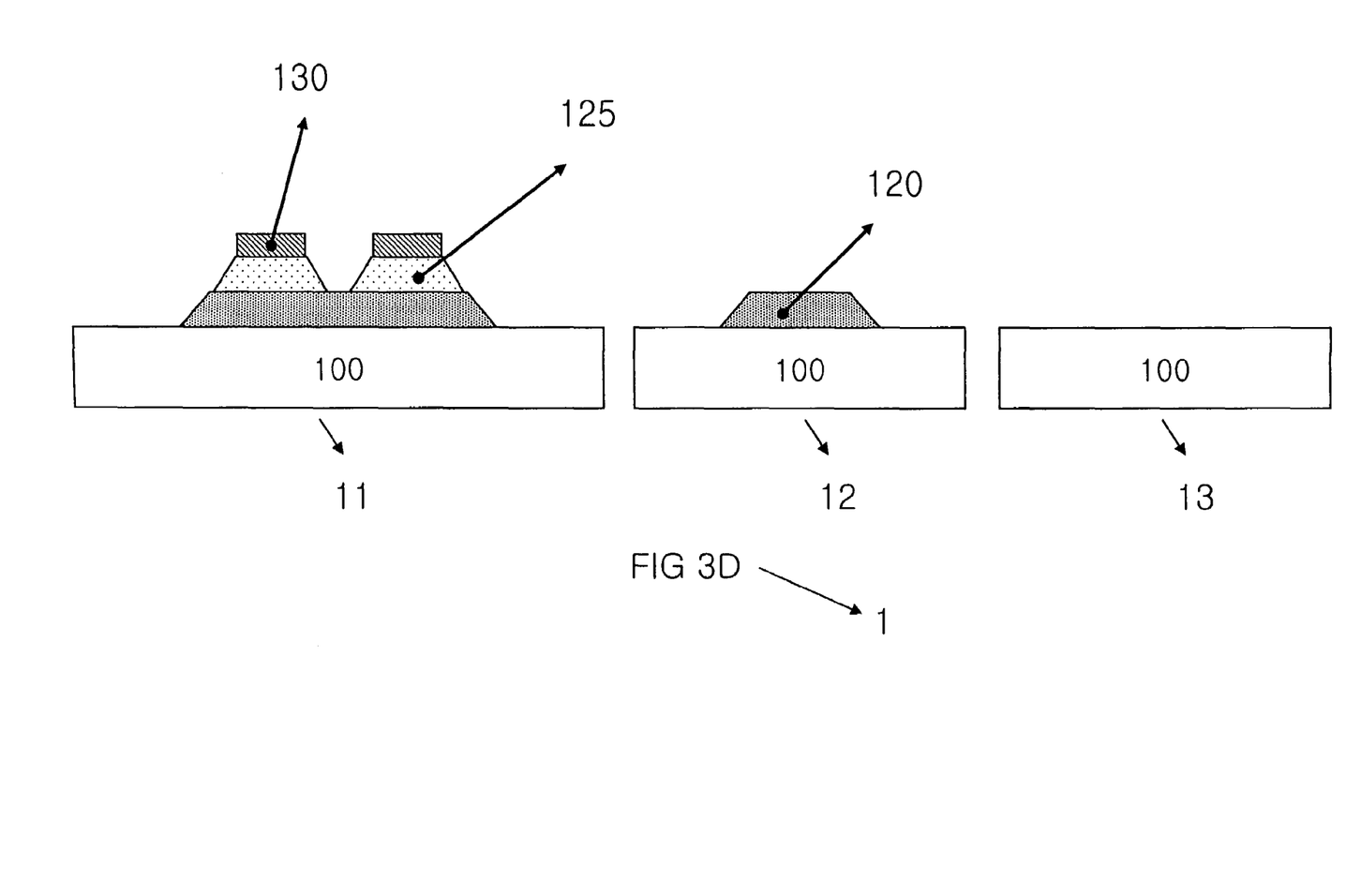

In one embodiment of the present invention, the seed layer 130 is wet etched by applying a combination of phosphoric acid, nitride acid, acitic acid and water. In etching the seed layer 130, the seed layer 130 is used as a mask to pattern etch the resistor layer 125 from the column pad region 12 and the row pad region 13 as shown in FIG. 3D. In etching the resistor layer 125 from the column pad region 12, the emitter electrode 120 is exposed in the column pad region for further development.

Figure 3E:
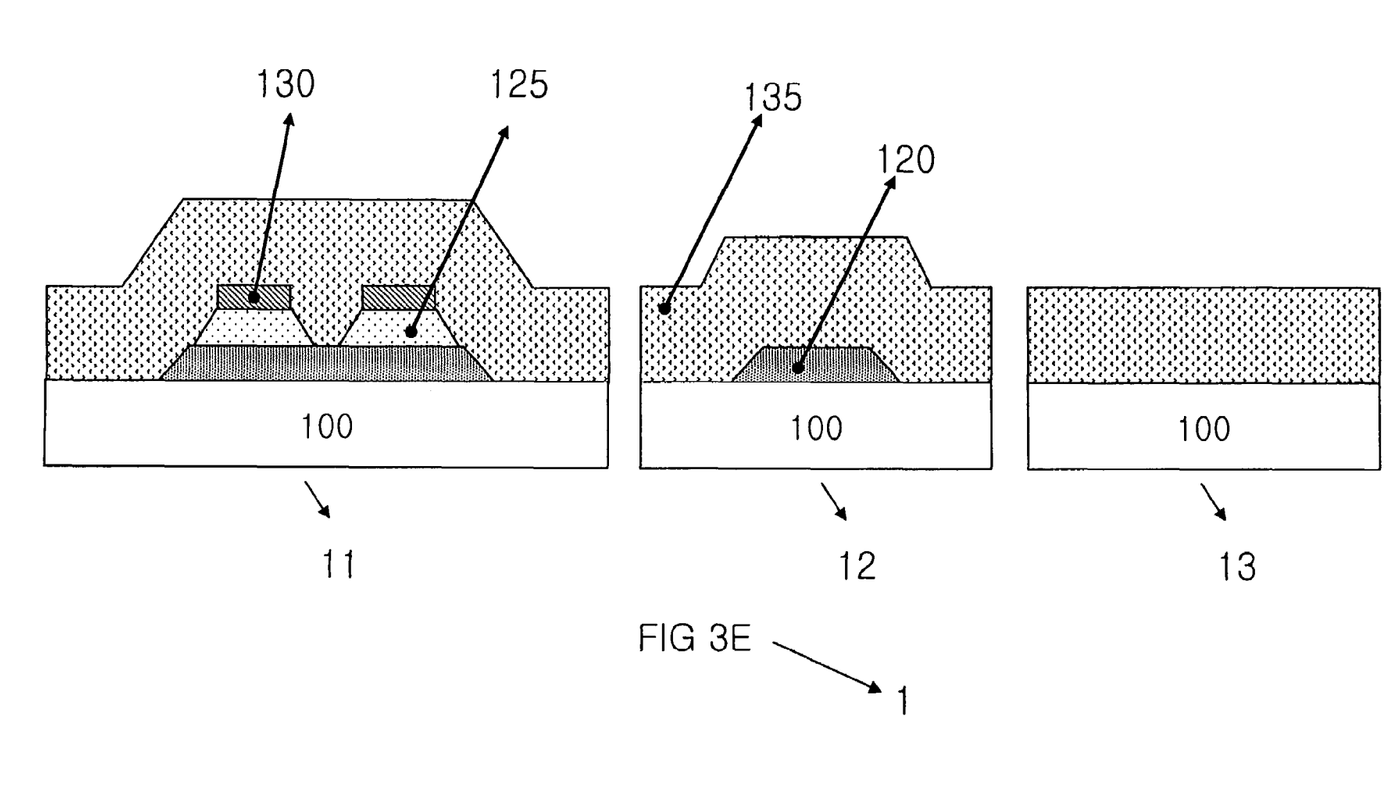

FIG. 3E depicts a partial cross-sectional representation of structure 1 having undergone further steps of depositing a dielectric layer 135. As shown in FIG. 3E, a blanket dielectric layer 135 is formed on the surface of the conductive seed layer 130 and the resistor layer 125 covering portions of the electrode emitter layer 120 that are exposed in the column pad region 12. The dielectric layer 135 also covers the exposed portions of the base plate 100 in the row pad region 13 left uncovered by the masking and etching off the resistor layer 125.

Figure 3F:
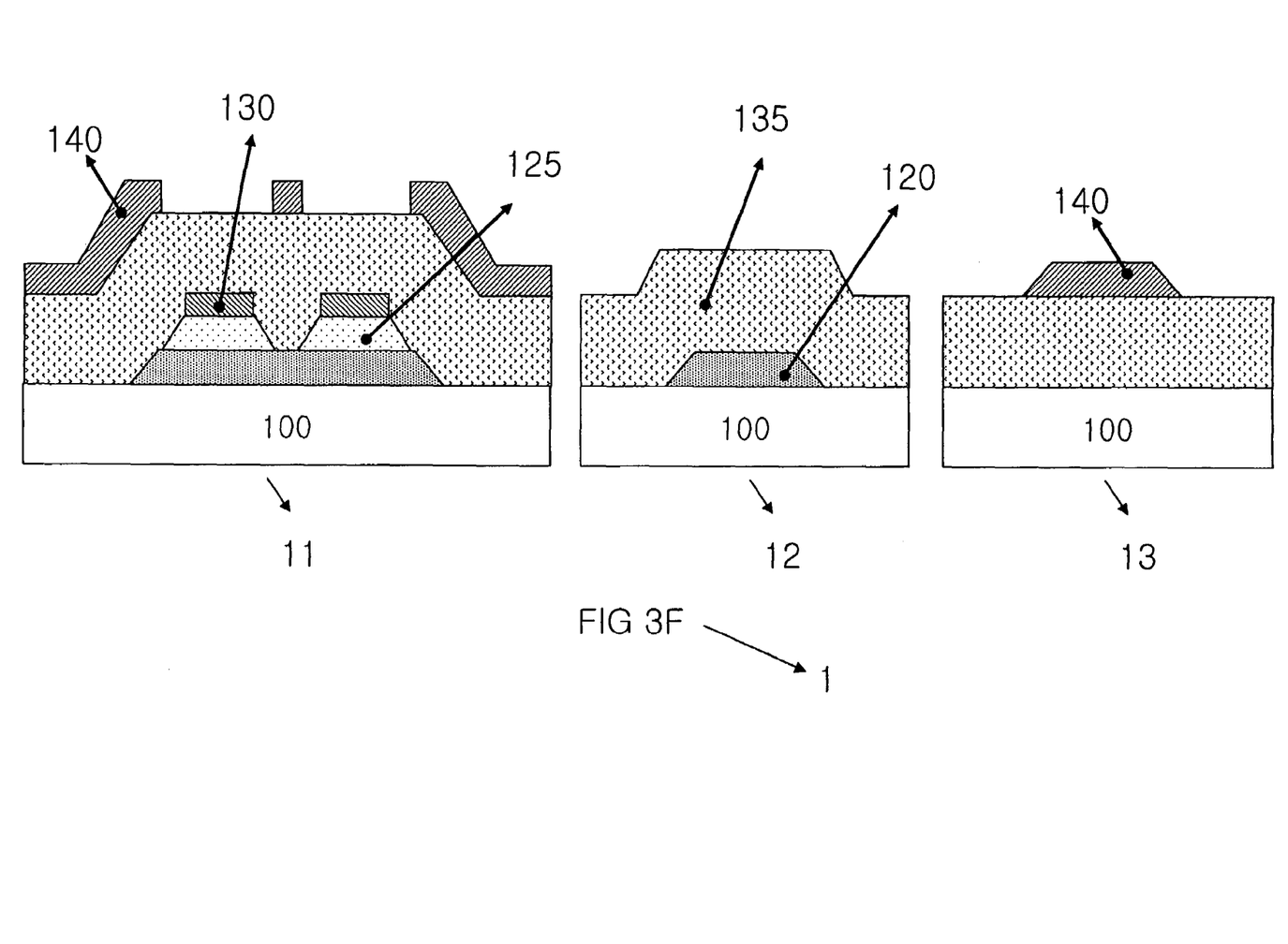

In FIG. 3F, a group of generally parallel gate electrodes 140 overlie dielectric strips 135 above conductive strips 130 and resistor strip 125 respectively. Each gate electrode 140 lies on the entire top surface of a corresponding one of dielectric strips 135 and, accordingly, fully overlies underlying conductive strip 130 and resistor strip 125. Due to the characteristics of the etch procedures typically used to define the longitudinal side edges of strips 130 and 125, each gate electrode 140 may be slightly wider or narrower than underlying dielectric strip 135. In one embodiment of the present invention, the gate metal electrode material 140 is not deposited on the dielectric layer 135 in the column pad region 12. The gate electrode 140 is sputter deposited on the dielectric layer 135. Upon deposition of the gate layer 140, a photo-resistive material (PR) is coated on the gate layer 140. After coating, the PR is soft baked, exposed and developed. The PR is subsequently hard baked and wet etched to conform to the contours of the surface of the dielectric layer 135. Remaining PR maskant is stripped by methods well known in the art.

Figure 3G:
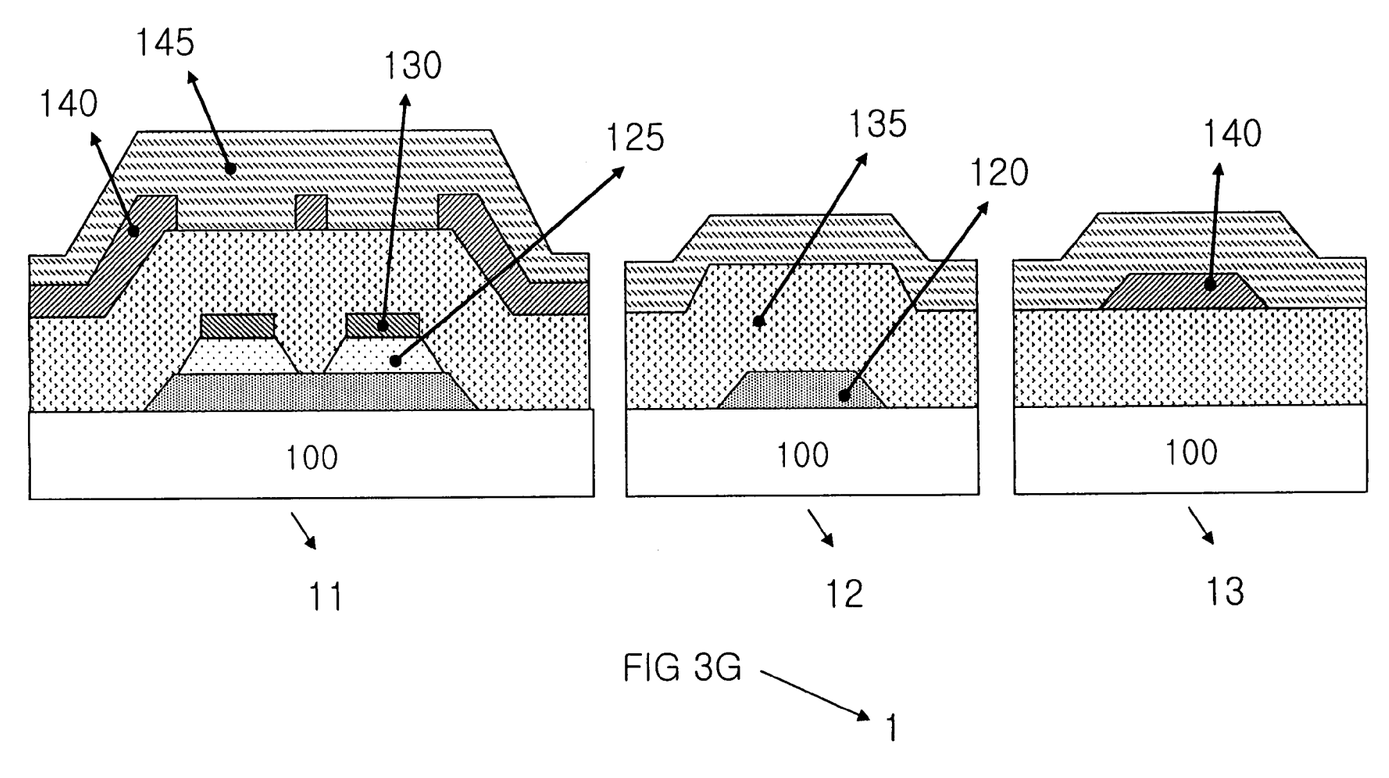

FIG. 3G depicts a partial cross-sectional representation of structure 1 having undergone further steps of depositing a blanket passivation layer 145. The passivation layer 145 is disposed on the gate layer 140 and portions of the dielectric layer 135 uncovered by the gate layer 140.

The passivation layer 145 overlies the entire top surface of a corresponding one of gate layer strips 140 and, accordingly, fully overlies underlying resistor strip 125. In one embodiment of the present invention, passivation layer 145 may be silicon dioxide ($SiO_2$), or silicon nitride (SiNx), or a mixture of these compounds. The passivation layer 145 is subsequently masked by a PR masking agent masking the passivation layer according to a designed pattern.

After masking, the passivation layer 145 and dielectric layer 135 are etched by a dry etching method, known in the art. Remaining PR is stripped.

Figure 3H:
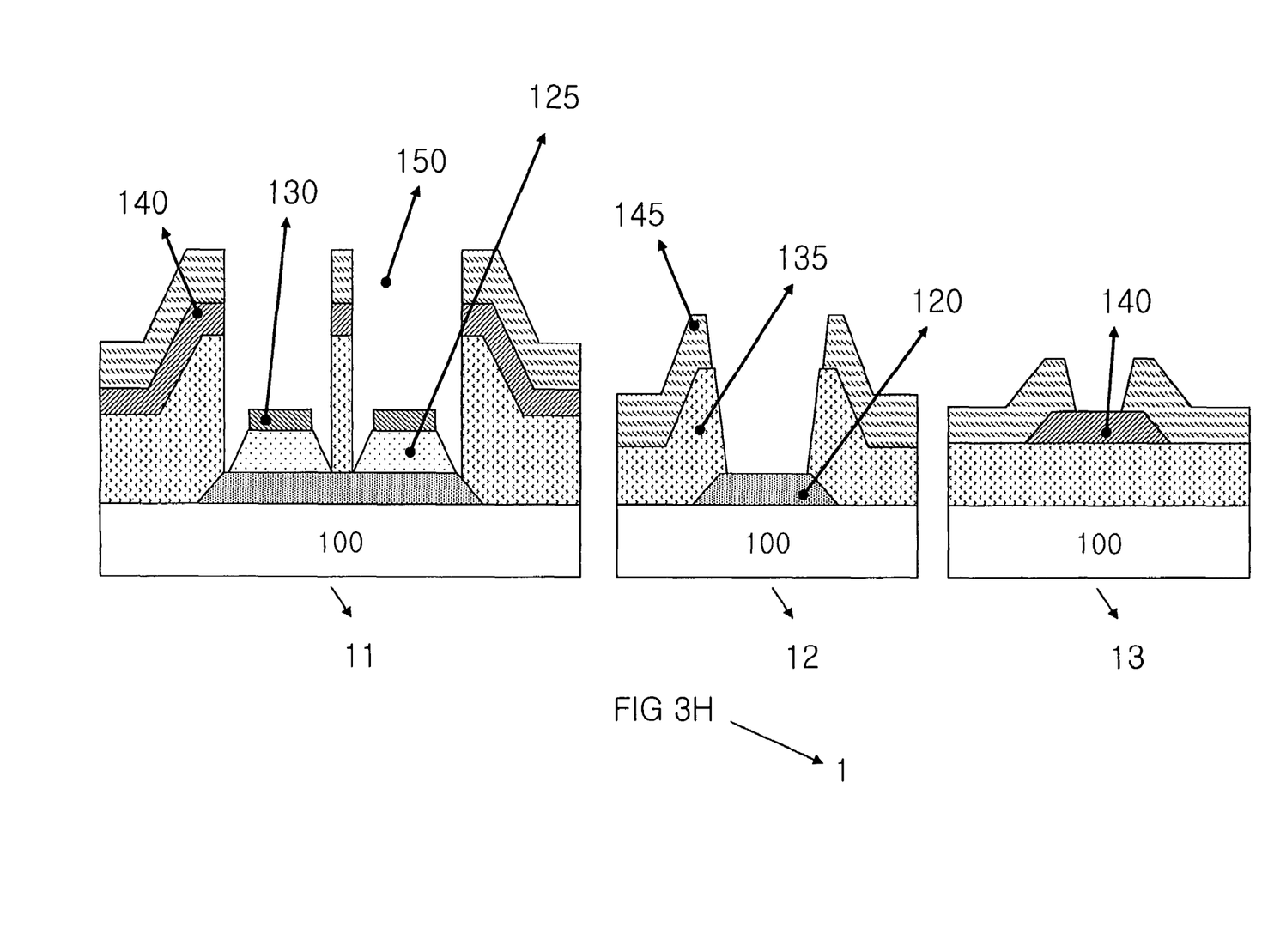

FIG. 3H depicts a partial cross-sectional representation of structure 1 having undergone further steps of etching the structure to create cavities for depositing the electron emission elements 155.

After depositing the passivation layer 145, the passivation layer 145, and the dielectric layer 135 are etched to create cavities or composite openings 150 for the formation of the carbon nano-tube emitters of the present invention.

A patterned dielectric layer 135 consisting of a group of laterally separated generally parallel strips 135 overlying the patterned resistor strips 125 and the conductive . . . seed-strips 130 is formed.

Each dielectric opening overlies a corresponding one of conductive strips 130. The longitudinal side edges of each dielectric strip 135 are in approximate vertical alignment with the longitudinal side edges of corresponding resistor strip 125 and seed strip 130 respectively.

Figure 5:
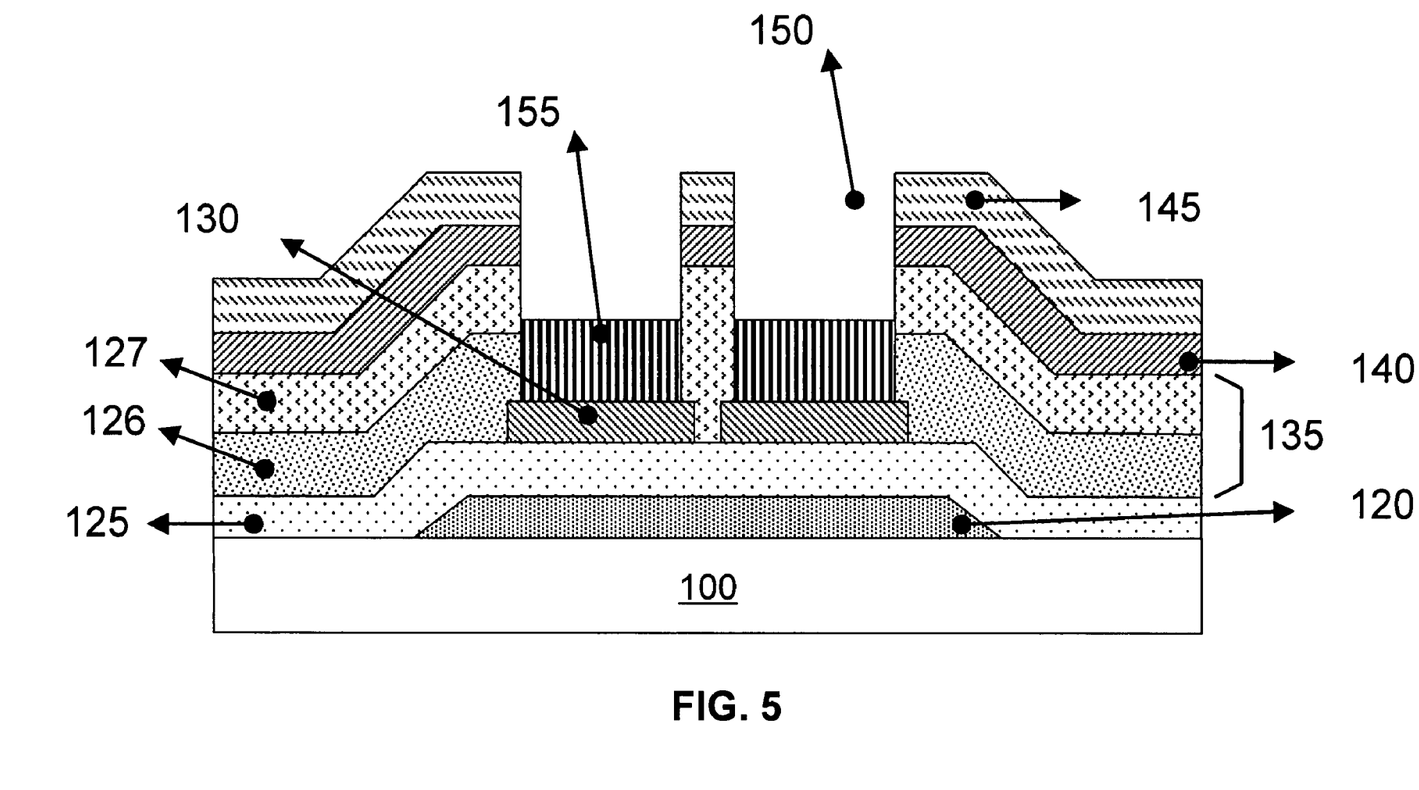
FIG. 5 is a cross-sectional structural view of another embodiment of the core of an electron-emitting device provided with a seed layer in accordance with the present invention.

FIG. 5 illustrates an embodiment of the invention in which the dielectric layer comprises a dual layer. As FIG. 5 illustrates, the dielectric strips 135 comprises two layers 126 and 127, which in one embodiment are formed of silicon dioxide and silicon nitride having a thickness of 0.5–2.0 µm. In another embodiment, dielectric layer 135 comprises a single layer of silicon-oxy-nitride having a thickness of 0.5–2.0 µm.

The patterning of the resistor layer 125 to form strips is typically performed with one or more dry etchants depending on the constituency of layer 125.

Gate electrodes 140 may be configured in various ways. For example, each electrode 130 can be implemented as a main gate portion and one or more thinner adjoining gate portions as described below in connection with FIG. 2

An array of rows and columns of laterally separated sets of electron-emissive elements 155 are disposed on top of conductive seed strips 130 in composite openings extending through dielectric strips 135 and gate electrodes 140. Each composite opening consists of (a) a dielectric opening 150 extending through one of dielectric strips 135 and (b) a gate opening 150 also extending through overlying gate electrode 140. The top of passivation opening 150 is typically the same as that of the gate 150 opening.

The carbon based electron-emissive-elements 155 are deposited on the seed strips 130 subsequent to the creation of cavities 150. In one embodiment of the present invention, a chemical vapor deposition (CVD) method of deposition may be used to deposit electron-emissive elements 155.

Each of the sets of electron-emissive elements 155 normally consists of multiple elements 155. Electron-emissive elements 155 in each different set contact a portion of a resistor strip 125 at the location where corresponding gate electrode 140 crosses over an emitter electrode 120.

Each set of elements 155 is electrically coupled through underlying seed strip 130 to underlying emitter electrode 120.

Consequently, the sets of elements 155 in each column of the electron-emissive-element sets are respectively electrically coupled through the underlying portions of all seed strips 130 to underlying emitter electrode 120. On the other hand, the sets of elements 155 in each row of the electron-emissive-element sets are electrically isolated through portions of underlying resistor strip 125 respectively to all of emitter electrodes 120.

The electron-emissive elements 155 are typically filaments in shape, as depicted in FIG. 2. In this case, the principal constituent of elements 155 is typically carbon. Elements 155 can be shaped differently, for example, as cylindrical. Dielectric openings 150 may then be shaped differently from what is generally indicated in FIG. 2.

During field emitter operation, an anode in the light-emitting device (not shown here) situated opposite elements 155 draws the extracted electrons towards light-emissive elements located close to the anode. As electrons are emitted by each activated electron-emissive element 155, a positive current flows through underlying seed strip 130 to underlying emitter electrode 120.

Seed strips 130 provide the field emitter with electron emission uniformity and short circuit protection. Strips 130 limit the number of electrons emitted by activated elements 155. Strips 130 further prevent electron emission through just a limited number of the electron emission elements 155. This is caused by the electrical isolation of the seed layer 130.

This prevents some of elements 155 from providing many more electrons than other of elements 155 at the same extraction voltage and thus prevents undesirable bright spots from occurring on the viewing surface of the flat-panel display.

Also, if one of gate electrodes 140 becomes electrically shorted to underlying seed strip 130 and thus becomes electrically coupled to underlying emitter electrode 120, the resistor strip 125 at the short circuit location significantly limits the current flowing through the short circuit connection. With proper electron-emitter design, the presence of the short circuit does not detrimentally affect the operation of any of the other sets of electron-emissive elements 155.

Such a short circuit can arise by way of a conductive path created through a dielectric strip 135 or by having one or more of electron-emissive elements 155 come into contact with their gate electrode 140. In the case of a gate-electrode-to-electron-emissive-element short circuit, each shorted electron-emissive element 155 is normally defective.

However, the resistor strips 125 limit the current through each shorted elements 155 sufficiently that non-shorted elements 155 in that set of electron-emissive elements may still operate in the intended manner. Seed strips 130 thus normally enable a set of electron-emissive elements 155 containing a small percentage of shorted elements 155 to perform the intended electron-emitting function in an adequate manner. Electron-emission uniformity is substantially maintained.

Figure 4:
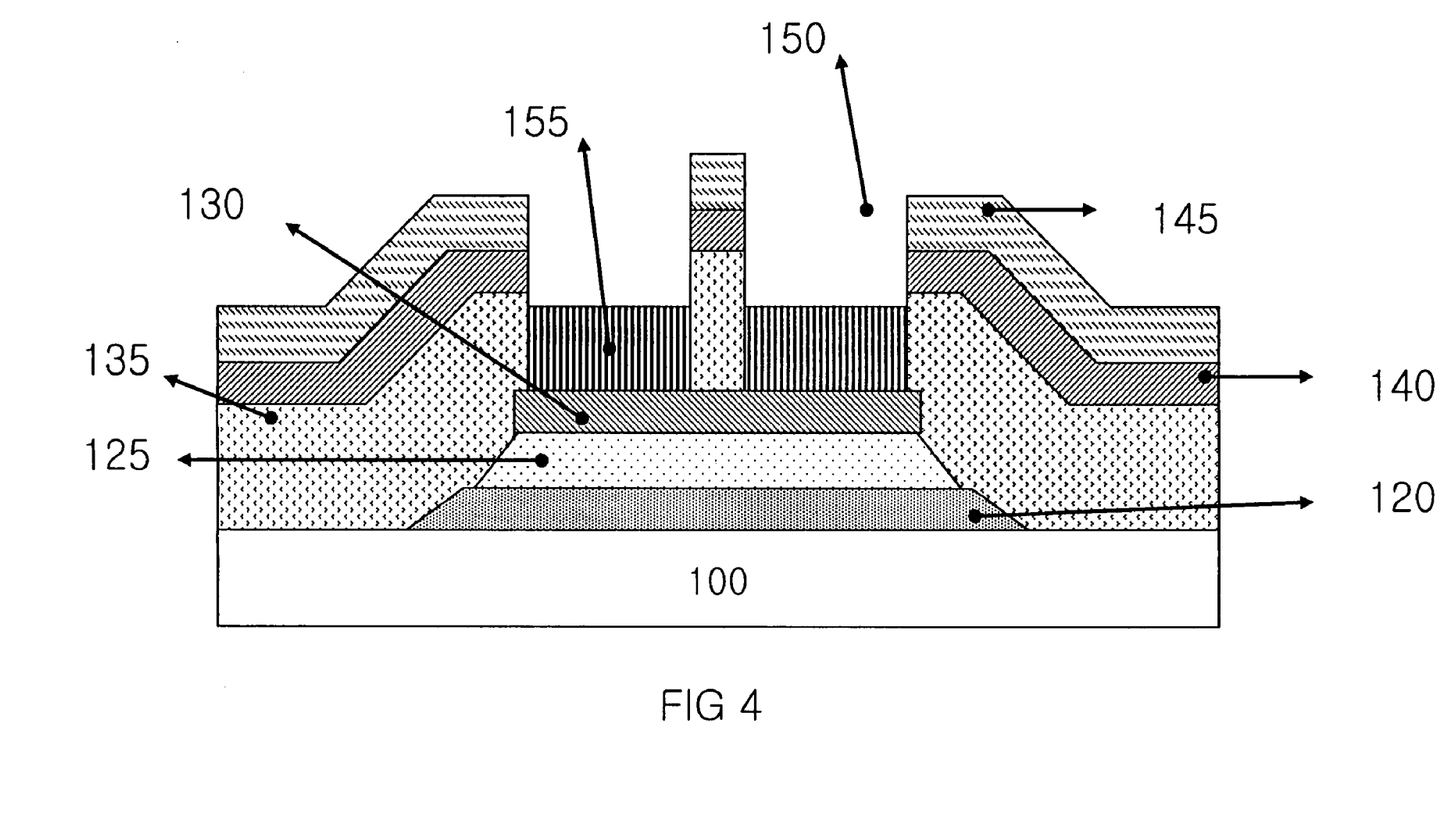
FIG. 4 is a cross-sectional structural view of another embodiment of the core of an electron-emitting device provided with a seed layer patterned in accordance with the present invention.

FIG. 4 illustrates the core of a matrix-addressed field emitters that contain an emitter conductor patterned into conductor strips in a vertically aligned manner according to the invention. The cross sections of FIG. 4 is taken through perpendicular planes.

The field emitter of FIG. 4 is created the same way as the structure in FIG. 2. However, the patterned resistor layer 125 and the electrically conductive seed layer 130 are patterned in a way so that the resistor strips 125 and the seed strips 130 are symmetrically over-align with the gate electrode 140. Symmetrically over-aligning the resistor strip 125 and the seed strips 130 with the gate electrode 140 reduces undesirable electron emission in the structure 1.

The electron emitters produced according to the invention can be employed to make flat-panel devices other than flat-panel CRT displays. Likewise, the present electron emitters can be used as electron sources in products other than flat-panel devices. Various modifications and applications may thus be made by those skilled in the art without departing from the true scope and spirit of the invention as defined in the appended claims.

What is claimed is:

1. An electron-emitting device comprising:
   an emitter electrode;
   a resistor layer comprising a plurality of laterally separated sections;
   a conductive seed layer comprising a plurality of laterally separated sections, each section of the seed layer overlying a section of the resistor layer;
   a dielectric layer;
   a gate electrode overlying the dielectric layer above the resistive layer; and
   a plurality of carbon based electron-emissive elements (a) positioned over the seed layer above the emitter electrode and (b) situated in one or more openings extending through the gate electrode and the dielectric layer.

2. An electron-emitting device comprising:
   an emitter electrode;
   an electrically resistive layer that includes a plurality of unconnected sections overlying at least a portion of the emitter electrode;
   a dielectric layer;
   a gate electrode overlying the dielectric layer above the resistive layer; and
   a multiplicity of electron-emissive elements (a) electrically coupled to the sections of the resistive layer and (b) situated in openings extending through the gate electrode and the dielectric layer.

3. A device as in claim 2 wherein the dielectric layer comprises a dual layer of silicon nitride and silicon dioxide.

4. A device as in claim 2, wherein the dielectric layer comprises a single layer of silicon nitride.

5. A device as in claim 2, wherein the dielectric layer comprises a single layer of silicon dioxide.

6. A device as in claim 2 wherein the multiplicity of electron-emissive-elements comprise carbon.

7. A device as in claim 6 wherein the multiplicity of electron-emissive-elements are filaments.

8. A device as in claim 2, wherein the electron-emissive elements coupled to at least two sections of the resistive layer define a smallest addressable display element of a display system.

9. A device as in claim 8, wherein the electron-emissive elements are allocated into a number of laterally separated sets, each set comprising multiple electron-emissive elements overlying a section of the resistive layer.

10. An electron-emitting device comprising:
    an emitter electrode;
    a gate electrode;
    a plurality of groups of electron-emissive elements situated in one or more openings through the gate electrode; and
    an electrically resistive layer including at least two laterally separated sections, each section of the resistive layer electrically coupled between one or more groups of electron-emissive elements and the emitter electrode.

11. The device of claim 10, wherein the electron-emissive elements are grown from a seed layer, the seed layer overlying at least a portion of the emitter electrode and electrically coupled in series between the resistive layer and the groups of electron-emissive elements.

12. The device of claim 11, further comprising:
    a dielectric layer disposed between the electrically resistive layer and the gate electrode.

13. The device of claim 11, wherein the dielectric layer comprises silicon nitride.

14. The device of claim 12, wherein the dielectric layer comprises silicon dioxide.

15. The device of claim 12, wherein the dielectric layer comprises a layer of silicon nitride and a layer of silicon dioxide.

16. The device of claim 10, wherein the electron-emissive elements comprise carbon.

17. The device of claim 10, wherein the electron-emissive elements comprise a number of carbon filaments.

18. The device of claim 10, wherein the sections of the resistive layer symmetrically over-align with the openings of the gate electrode.

19. The device of claim 10, wherein multiple sections of the resistive layer correspond to a smallest addressable display element of a display system.

20. The device of claim 10, wherein multiple sections of the resistive layer correspond to a single color for a pixel of a display system.

* * * * *

UNITED STATES PATENT AND TRADEMARK OFFICE
CERTIFICATE OF CORRECTION

PATENT NO.        : 7,053,538 B1
APPLICATION NO.   : 10/080012
DATED             : May 30, 2006
INVENTOR(S)       : Chul Ha Chang et al.

It is certified that error appears in the above-identified patent and that said Letters Patent is hereby corrected as shown below:

Claim 13, at column 10, line 33, please change "claim 11" to --claim 12--.

Signed and Sealed this

Twenty-first Day of November, 2006

JON W. DUDAS
*Director of the United States Patent and Trademark Office*